(No Model.)
J. F. WEITZEL & T. LEE.
FLUE STOPPER.
No. 384,341. Patented June 12, 1888.
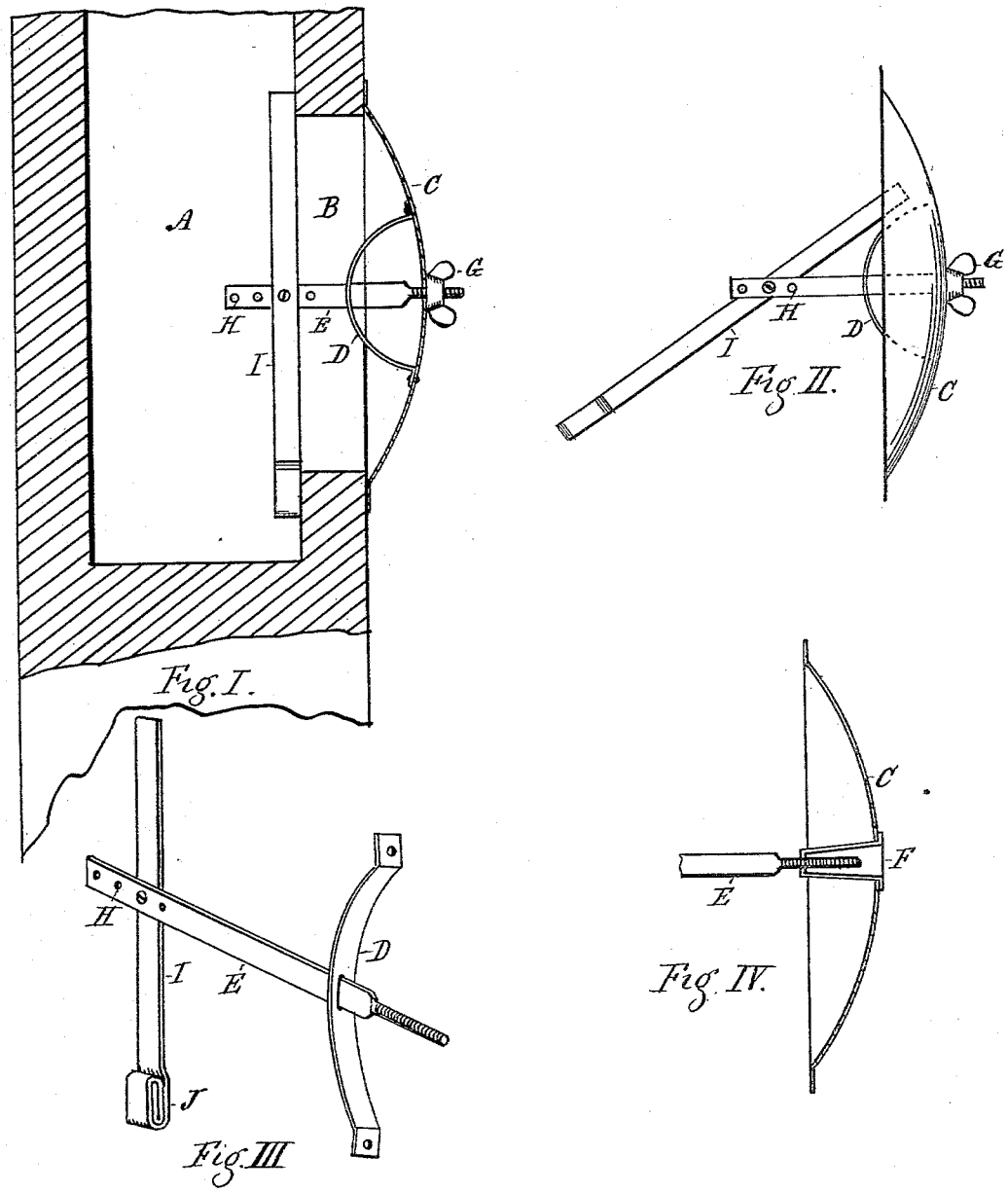
Witnesses:
Robert Kirk.
Robt. S. Millar
Inventors:
Jacob F. Weitzel.
Thomas Lee,
By
Attorney.

UNITED STATES PATENT OFFICE.

JACOB F. WEITZEL AND THOMAS LEE, OF CINCINNATI, OHIO; SAID WEITZEL ASSIGNOR TO SAID LEE.

FLUE-STOPPER.

SPECIFICATION forming part of Letters Patent No. 384,341, dated June 12, 1888.

Application filed November 10, 1887. Serial No. 254,810. (No model.)

*To all whom it may concern:*

Be it known that we, JACOB F. WEITZEL and THOMAS LEE, of Cincinnati, in the county of Hamilton and State of Ohio, have invented a new and useful improvement in Flue-Stoppers, which improvement is fully set forth in the following specification and accompanying drawings, in which—

Figure I is a vertical sectional view of a chimney or flue the pipe-hole of which is closed by one of our improved flue-caps or adjustable disks. Fig. II is a perspective view of the adjustable disk and stem with the centrally-pivoted lever turned so as to insert same in the pipe-hole; Fig. III, a perspective view of the stem and lever with the disk removed, and Fig. IV a modified form of attaching the stem to the disk.

The object of our invention is to provide a cap or disk for closing the pipe-hole of a chimney-flue; and it consists of a disk of the usual shape and form having on its inner side a bridge, and centrally through this disk and the bridge are apertures to receive a stem. The outer end of this stem is screw-threaded to receive a nut, while its inner end has a series of perforations to receive at a suitable point a lever, one end of which is weighted, for purposes which will now be set forth in detail.

In the accompanying drawings, A represents the flue, and B the pipe-hole in the side wall.

C is the disk or cap of the usual construction provided centrally with an opening. On the inner side of this disk is a bridge, D, provided with a hole in line with the central hole in the disk. The hole through the bridge is preferably square or rectangular to receive the square or rectangular body of the stem E. The hole through the disk is round to receive the round threaded end of this stem, or the disk may have an enlarged opening centrally, as shown in Fig. IV, and a flanged tubular nut, F, employed, instead of the thumb-nut G shown in Figs. I and II. The inner end of the stem E has a series of holes, H.

I is a lever centrally pivoted to the stem E. The lower end of this lever is weighted in any suitable manner, as shown at J, Fig. III.

In attaching the device to a chimney-hole the lever I is so adjusted on the stem E that the space between the rim of the disk and the lever I will be equal to the thickness of the wall of the flue. The thumb-nut G is then turned so as to slightly increase the distance between, and the lever I is turned to the position shown in Fig. II, and inserted in the chimney-hole B until the rim of the disk rests against the face of the wall. The weight J, on the lower end of the lever I, causes the latter to assume a vertical position when the disk is adjusted in place, so that the upper and lower ends of the lever rest against the inner wall of the flue, as shown in Fig. I. The nut G is then turned up tight, so as to bind the disk firmly to the wall of the flue.

What we claim as new is—

1. In a disk or cap for chimney-flues, a disk having centrally an adjustable stem provided on its inner end with an adjustable weighted lever, substantially as herein set forth.

2. A disk or cap having centrally a rearwardly-projecting stem provided with a centrally-pivoted lever having a weight at one end, substantially as herein set forth.

3. In a cap or disk for chimney-flues, the combination of a disk centrally perforated, and provided on its rear side with a bridge, having an opening on a line with the disk perforation, with a stem having its forward end screw-threaded and provided with a thumb-nut, and its rear end provided with a series of perforations, and having hinged thereto a lever weighted at one end, substantially as herein set forth.

In testimony that we claim the foregoing we we have hereunto set our hands, this 18th day of October, 1887, in the presence of witnesses.

JACOB F. WEITZEL.
THOMAS LEE.

Witnesses:
EDWARD BARTON,
ROBT. S. MILLAR.